US007995578B2

(12) United States Patent
Kim et al.

(10) Patent No.: US 7,995,578 B2
(45) Date of Patent: Aug. 9, 2011

(54) REPETITION APPARATUS AND METHOD FOR REPEATEDLY TRANSMITTING AND RECEIVING DATA PACKET USING DIFFERENT PUNCTURING PATTERNS

(75) Inventors: Pansoo Kim, Daejon (KR); In-Ki Lee, Busan (KR); Dae-Ig Chang, Daejon (KR); Ho-Jin Lee, Daejon (KR); Namshik Kim, Seoul (KR); Bongseop Song, Daejon (KR); Hyuncheol Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 89 days.

(21) Appl. No.: 12/334,043

(22) Filed: Dec. 12, 2008

(65) Prior Publication Data
US 2009/0154458 A1 Jun. 18, 2009

(30) Foreign Application Priority Data

Dec. 14, 2007 (KR) .................. 10-2007-0131243
Sep. 24, 2008 (KR) .................. 10-2008-0093769

(51) Int. Cl.
*H04J 3/16* (2006.01)
(52) U.S. Cl. .................. 370/390; 370/389; 370/391
(58) Field of Classification Search .................. 370/390, 370/389, 391
See application file for complete search history.

(56) References Cited

U.S. PATENT DOCUMENTS

| 6,987,778 | B2 * | 1/2006 | Sindhushayana et al. .... | 370/468 |
| 7,058,132 | B1 * | 6/2006 | Sebire et al. .................. | 375/259 |
| 2005/0063473 | A1 * | 3/2005 | Koyama et al. .......... | 375/240.27 |
| 2005/0226325 | A1 * | 10/2005 | Dei et al. .................. | 375/240.12 |
| 2007/0091926 | A1 * | 4/2007 | Apostolopoulos et al. ... | 370/473 |
| 2007/0116108 | A1 * | 5/2007 | Chen et al. .................... | 375/231 |
| 2007/0142009 | A1 | 6/2007 | Scarpa et al. | |
| 2007/0198893 | A1 * | 8/2007 | Hwang et al. ................. | 714/769 |
| 2007/0232344 | A1 * | 10/2007 | Aoki et al. ..................... | 455/522 |
| 2008/0065963 | A1 * | 3/2008 | Ko et al. ....................... | 714/776 |
| 2008/0310379 | A1 * | 12/2008 | Lim et al. ...................... | 370/338 |
| 2009/0013356 | A1 * | 1/2009 | Doerr et al. ..................... | 725/62 |

FOREIGN PATENT DOCUMENTS
KR 1020030032781 A 4/2003

OTHER PUBLICATIONS

Cioni et al., "Advanced Fade Countermeasures for DVB-S2 Systems in Railway Scenarios", EURASIP Journal on Wireless Communications and Networking, vol. 2007, Article ID 49718, 17 pages.
Leonardo Provvedi et al., "Provision of MBMS Over the Geran: Technical Solutions and Performance", IEEE International Conf. on 3G Mobile Comm. Tech., pp. 494-498, 2004.

* cited by examiner

*Primary Examiner* — Daniel J Ryman
*Assistant Examiner* — Jay P Patel
(74) *Attorney, Agent, or Firm* — Rabin & Berdo, P.C.

(57) ABSTRACT

Provided are repetition apparatus and method for repeatedly transmitting and receiving a data packet using different puncturing patterns to overcome signal attenuation and fading in a high speed mobile environment by repeatedly transmitting the duplicated information bit sequences with parity bits having a different puncturing pattern after channel-encoding the duplicated information bit. The repetition apparatus for repeatedly transmitting a data packet, includes a dual data generator for generating duplicated information bit sequences identical to each of information bit sequences to transmit, a channel encoder for dividing each of the duplicated information bit sequences into a plurality of information bits, and generating coded data packets alternately having a plurality of parity bits according to different puncturing patterns for each of the divided information bits, and a transmitter for transmitting the generated coded data packets sequentially.

14 Claims, 6 Drawing Sheets

REPETITION APPARATUS AND METHOD FOR REPEATEDLY TRANSMITTING AND RECEIVING DATA PACKET USING DIFFERENT PUNCTURING PATTERNS

BACKGROUND OF THE INVENTION

1. Field of the Invention

The present invention relates to a data transmission technology in a high speed mobile channel environment; and, more particularly, to repetition apparatus and method for repeatedly transmitting and receiving data packets by using different puncturing patterns to overcome signal attenuation and fading in a high speed mobile environment by repeatedly transmitting the duplicated information bit sequences with parity bits having a different puncturing pattern after channel-encoding the duplicated information bit.

This work was supported by the IT R&D program of MIC/IITA [2006-S-020-03] "Development of Satellite and Terrestrial Convergence Technology for Internet Service on Highspeed Mobile Vehicles"].

2. Description of Related Art

Lately, a satellite based data transmission technology for a railway environment, for example, an environment for a bullet train, has been receiving an attention. In general, a satellite link provides a data transmission service and a broadcasting service only in an environment that guarantees a line of sight (LOS).

The railway condition is characterized as a high speed environment compared to a land mobile object such as a bus or a vehicle and also includes many blockages that cause signal shadowing, such as a power arch or a power line.

Figure 1:
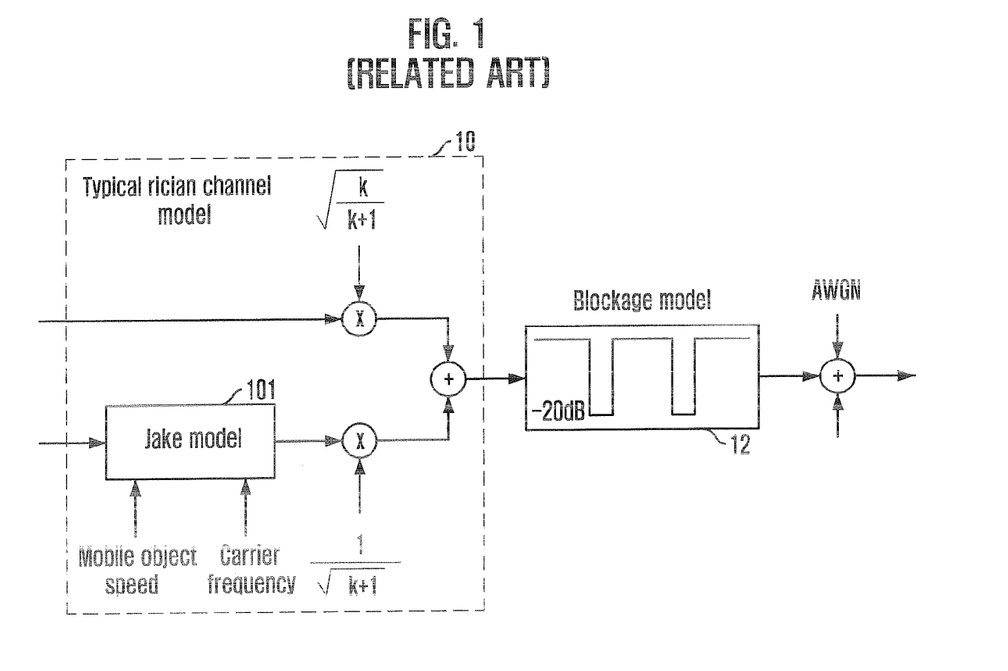
FIG. 1 is a diagram illustrating a rician fading channel model in a blockage environment.

FIG. 1 is a diagram illustrating a rician fading channel model in a blockage environment.
A typical rician channel model 10 in a non-blockage environment is generally composed of the channel generated as Rayleigh fading component through Jake model 101 and the channel of LOS component, respectively. In general, the rician factor K is equivalent to the ratio of LOS and NLOS.

As described above, a transmitted signal is attenuated by blockages such as a building, a bridge, and a power line in a high speed mobile environment. Particularly, a power arch attenuates a Ka band signal up to −20 dB. A blockage model 12 of FIG. 1 denotes such a blockage environment.

In the channel environment having blockages, data packets may be continuously lost according to the speed of a moving object or the number of blockages. When data packets are transmitted in a blockage region, error floor occurs without reference to a modulation scheme or a cording rate.

Therefore, it is required to develop a technology to overcome signal attenuation and fading environment in such a blockage channel environment.

SUMMARY OF THE INVENTION

An embodiment of the present invention is directed to providing a repetition apparatus and method for repeatedly transmitting and receiving a data packet using different puncturing patterns to overcome signal attenuation and fading in a blockage channel environment of a high speed mobile environment.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a repetition apparatus for repeatedly transmitting a data packet, including a dual data generator for generating duplicated information bit sequences identical to each of information bit sequences to transmit, a channel encoder for dividing each of the duplicated information bit sequences into a plurality of information bits, and generating coded data packets alternately having a plurality of parity bits according to different puncturing patterns for each of the divided information bits, and a transmitter for transmitting the generated coded data packets sequentially.

In accordance with another aspect of the present invention, there is provided a repetition apparatus for repeatedly receiving a data packet, including a receiver for receiving coded data packets transmitted through a wireless channel, and a channel decoder for obtaining original information bits and a plurality of parity bits by a corresponding packet from a plurality of coded data packet groups which are repeatedly received at different reception times, and performing a channel decoding operation on each of the obtained information bits using a plurality of corresponding parity bits.

In accordance with still another aspect of the present invention, there is provided a repetition method for repeatedly transmitting a data packet, comprising generating duplicated information bit sequences for each of information bit sequences to transmit, dividing each of the duplicated information bit sequences into a plurality of information bits, generating coed data packets alternately having a plurality of parity bits according to different puncturing patterns for each of the divided information bits, and transmitting the generated coded data packets sequentially.

In accordance with yet another aspect of the present invention, there is provided a repetition method for repeatedly receiving a data packet including receiving coded data packets transmitted through a wireless channel, obtaining original information bits and a plurality of parity bits by a corresponding packet from a plurality of coded data packet groups repeatedly received at different reception times, and performing a channel decoding on each of the obtained information bits using a plurality of corresponding parity bits.

DESCRIPTION OF SPECIFIC EMBODIMENTS

The advantages, features and aspects of the invention will become apparent from the following description of the embodiments with reference to the accompanying drawings, which is set forth hereinafter. When it is considered that detailed description on a related art may obscure a point of the present invention, the description will not be provided herein. Hereinafter, specific embodiments of the present invention will be described with reference to the accompanying drawings.

Figure 2A:
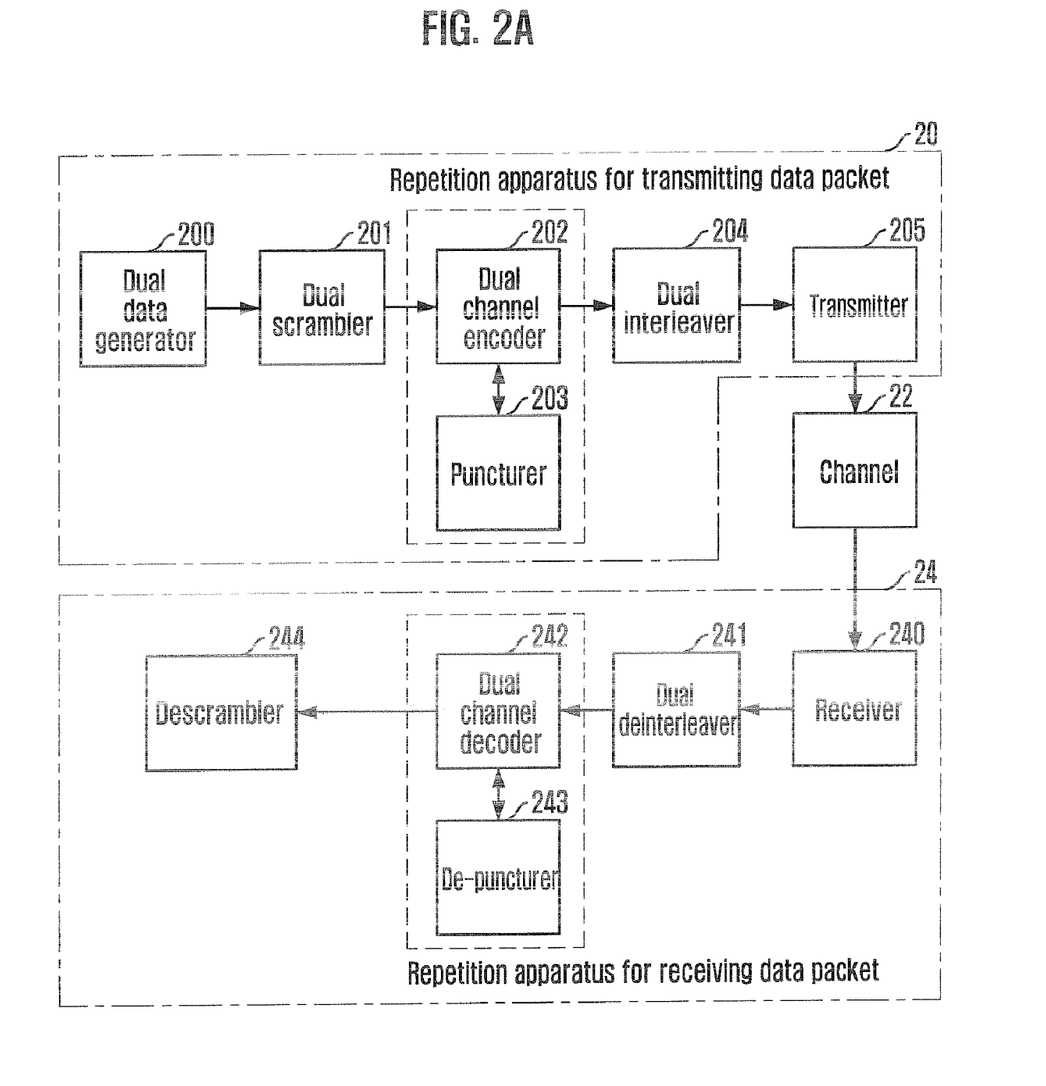
FIGS. 2A and 2B are diagrams illustrating a repetition apparatus for repeatedly transmitting and receiving data packets using different puncturing patterns in accordance with an embodiment of the present invention.
Figure 2B:
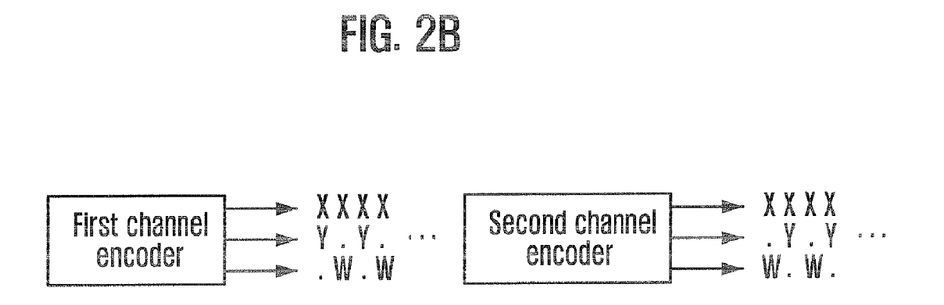

FIGS. 2A and 2B are diagrams illustrating a repetition apparatus for repeatedly transmitting and receiving data packets using different puncturing patterns in accordance with an embodiment of the present invention.

At first, the repetition apparatus 20 for repeatedly transmitting data packets according to the present embodiment will be described. Referring to FIGS. 2A and 2B, the apparatus 20 includes a dual data generator 200, a dual scrambler 201, a dual channel encoder 202, a puncturer 203, a dual interleaver 204, and a transmitter. Hereinafter, each of the constituent elements will be described.

The dual data generator 200 generates duplicated data sequences identically to each of information bit sequences corresponding a predetermined data size. That is, the dual data generator 200 generates same data to be transmitted repeatedly. Since the repetition apparatus according to the present embodiment will be described as repeatedly transmitting same data twice, a term 'dual' is used for convenience.

The dual scrambler 201 individually scrambles each of the information bit sequences that are repeatedly generated in the dual data generator 200. However, the information bit sequences may be not scrambled in other embodiments of the present invention.

The dual channel encoder 202 generates a plurality of parity bits according to a predetermined cording rate for each of the scrambled information bit sequences outputted from the dual scrambler 201 and generates coded data by alternately disposing the generated parity bits according to different puncturing patterns. For example, the dual channel encoder 202 generates two parity bits Y and W when the cording rate is ⅓.

As shown in FIG. 2B, the dual channel encoder 202 may include two independent channel encoders. Each of the channel encoders divides the scrambled information bit sequence into a plurality of information bits, for example, N information bits, and generates a coded data packet by disposing a corresponding parity bit at each of the information bits according to a predetermined puncturing pattern. Therefore, the dual channel encoder 202 generates and outputs two coded data packet groups each formed of N coded data packets #0 to #N−1 (See FIG. 3).

The puncturer 203 provides a puncturing pattern to be applied to the generation of the coded data packet in the dual channel encoder 202. The puncturer 203 provides different puncturing patterns to a first channel encoder and a second channel encoder of the dual channel encoder 202 (see Table 1).

The dual interleaver 204 performs an interleaving operation on each of the coded data packet groups. The interleaving operation is performed in a unit of the entire packet group.

The transmitter 205 transmits the output of the dual interleaver 204 through a wireless channel 22. That is, the transmitter 205 sequentially transmits data packets by the coded data packet group. For example, the transmitter 205 transmits N packets of a first coded data packet group and transmits N packets of a second coded data packet group.

Hereinafter, a repetition apparatus 24 for repeatedly receiving a data packet will be described. The repetition apparatus 24 includes a receiver 240, a dual deinterleaver 241, a dual channel decoder 242, a de-puncturer 243, and a descrambler 244. Hereinafter, each of the constituent elements will be described.

The receiver 240 receives coded data packets transmitted through a wireless channel. The dual deinterleaver 241 performs a deinterleaving operation on two received coded data packet groups by a group. Here, the two received coded data packet groups are groups of data packets received at different times.

The dual channel decoder 242 obtains original information bits and a plurality of parity bits by each packet from the two received coded data packet groups and channel-decodes the received data packets using the obtained information bits and corresponding parity bits.

Figure 3:
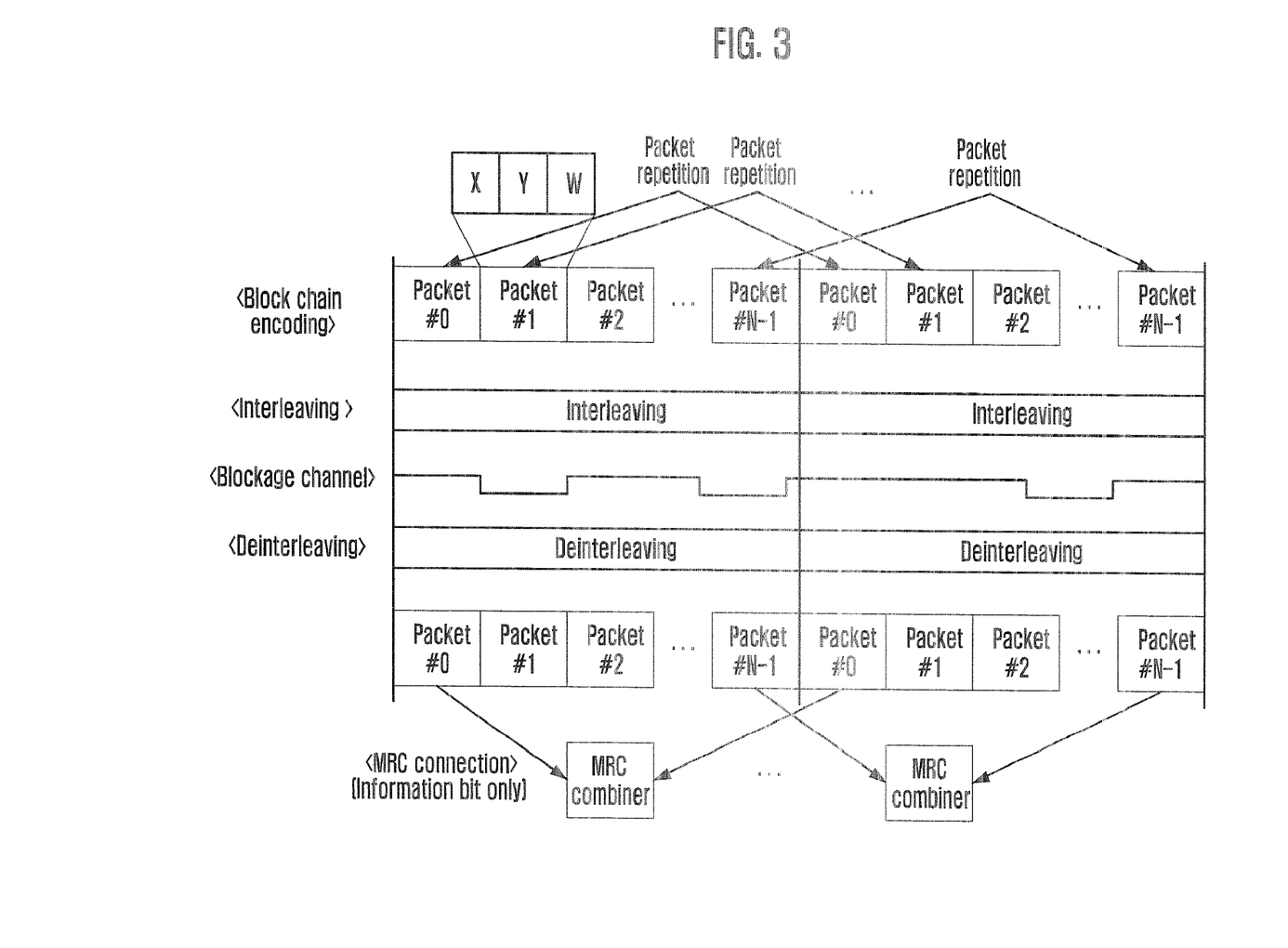
FIG. 3 is a diagram illustrating a repetition apparatus for repeatedly receiving data packets using different puncturing patterns in accordance with an embodiment of the present invention.

That is, the dual channel decoder 242 estimates original information bits, which were repeatedly transmitted from a transmitter, based on a maximal ratio combining (MRC) process using the coded data packets, which are generated for the same information bit, as a corresponding packet (See FIG. 3). For example, the coded data packets generated for the same information bit may be a packet #0 of a first coded data packet group and a packet #0 of a second coded data packet group. If no corresponding packet exists due to transmission in a blockage region, the original information bit is estimated from the information bits of the remaining data coded packets.

The dual channel decoder 242 obtains two different parity bits from a corresponding packet using a predetermined puncturing pattern for each of the estimated N information bits. Then, the dual channel decoder 242 corrects errors through channel decoding. Here, the puncturing pattern is a puncturing patter used in the transmitting side, which is provided by the de-puncturer 243.

The descrambler 244 descrambles the information bit sequence which is channel-decoded and outputted from the dual channel decoder 242. Here, the information bit sequence is an information bit sequence formed of N information bits.

FIG. 3 is a diagram illustrating a repetition apparatus for repeatedly transmitting and receiving data packets using different puncturing patterns in accordance with an embodiment of the present invention.

A code word forms one packet with a cording rate of ⅓. For example, the code word includes an information bit X and parity bits Y and W as shown in FIG. 3.

The repetition apparatus 20 for repeatedly transmitting a data packet according to the present embodiment performs an interleaving operation every N packets to overcome a blockage channel and repeatedly transmits data packets using a code word with different puncturing patterns to improve data transmission efficiency. Correspondingly, the repetition apparatus 24 for repeatedly receiving a data packet according to the present embodiment performs a de-interleaving operation every N packets and obtains $X^{MRC}$ for the information bits of repeatedly received each packet using a maximal ratio combining (MRC) process. The parity bits of the first received packet are $Y^{(1)}$ and $W^{(1)}$, and the parity bits of the second received packet area $Y^{(2)}$ and $W^{(2)}$.

Using a turbo code (TC) encoder, a packet having a cording rate of ⅓ for an information bit X is obtained, and a coded packet having a cording rate of ½ is obtained through the first puncturing pattern $P^{(1)}$ of Table 1. Total N coded packets, which are obtained as described above, are concatenated and interleaved, and mapped to BPSK or QPSK modulation symbols. Then, the symbols are transmitted.

After transmitting, next N coded packets (repeated transmission packets) are obtained by applying the second puncturing pattern $P^{(2)}$ of Table 1 to the same (X, Y, W) packet. The obtained N coded packets (repeated transmission packets) are transmitted through the same transmission process (interleaving and modulation). In the present embodiment, different puncturing patterns are applied in the first transmission process and the second transmission process.

While transmitting packets, the interleaving operation is performed every N packets to distribute a signal transmitted in a blockage region into a plurality of packets. Accordingly, the receiving apparatus performs the de-interleaving operation every N packets.

In the receiving side, original information bits are restored using 2N packets. Here, the MRC process is performed only using the information bits of each packet. Then, the decoding operation is performed using the obtained information bits obtained and the repeatedly received each parity bit as a ⅓ code.

Table 1 shows puncturing patterns used for repeatedly transmitting packets in the present embodiment. In Tale 1, $P^{(i)}$ denotes a puncturing pattern for the $i^{th}$ transmission, '1' denotes a bit to transmit, and '0' denotes a bit not to transmit.

TABLE 1

| | $P^{(1)}$ | $P^{(2)}$ |
|---|---|---|
| $\begin{bmatrix} X \\ Y \\ W \end{bmatrix}$ | $\begin{bmatrix} 1 & 1 & 1 & 1 \\ 1 & 0 & 1 & 0 \\ 0 & 1 & 0 & 1 \end{bmatrix}$ | $\begin{bmatrix} 1 & 1 & 1 & 1 \\ 0 & 1 & 0 & 1 \\ 1 & 0 & 1 & 0 \end{bmatrix}$ |

In view of the information bit, the puncturing pattern has meaning as follows. In the receiving side, time diversity effect is obtained by repeatedly receiving the same data packet when a packet is transmitted not in a blockage region. Also, it is possible to prevent the failure of receiving a transmitted packet. That is, it is possible to restore an original signal using one of repeatedly transmitted signals although one of two transmissions is performed in the blockage region.

Hereinafter, the maximal ratio combining (MRC) process, which is applied for repeatedly transmitted packet from a receiving side, will be described.

Eq. 1 shows a MRC signal r when a transmission symbol x is transmitted twice. In Eq. 1, $h_0$ and $h_1$ denote each channel, and $w_0$ and $w_1$ denote noise signals.

$$y_0 = h_0 x + w_0$$
$$y_1 = h_1 x + w_1$$
$$r = h_0^* y_0 + h_1^* y_1 = (|h_0|^2 + |h_1|^2)x + h_0^* w_0 + h_1^* w_1$$

Eq. 1

When the same symbol is transmitted twice in a normal channel region, not a blockage region, the receiving side can obtain time diversity effect, thereby improving performance. Unlikely, when one of two transmission of the same symbol is performed in the blockage region, that is, when one of the symbols is transmitted in the blockage region, the receiving side can restore a transmission symbol through the symbol that was transmitted in the normal channel region.

Meanwhile, it is possible to perform decoding of a ⅓ code because the transmitting side encodes the same information bit sequence and repeatedly transmits the same encoded information bit sequence with a different parity Y or W. That is, although the data transmission efficiency is identical to the repeated transmission of a ½ code, the receiving side can obtain a great code gain by performing the ⅓ code decoding. However, when a symbol corresponding to a parity bit is transmitted in the blockage region, a corresponding signal cannot be restored. Since such a signal is distributed into a plurality of packets, the performance thereof is better than a ½ code although it is impossible to obtain the performance of the ⅓ code.

The present invention relates to a transmission method using a time diversity scheme. The present invention transmits a parity check data, which is used for error correction, twice with different puncturing patterns instead of simply transmitting the same data twice.

Disadvantageously, a transmit rate may be reduced when data packets are re-transmitted for overcoming a blockage channel environment. The repetition scheme according to the present embodiment has a transmit rate 0.5 times reduced compared with a transmit rate when a data packet is not repeatedly transmitted. If a symbol speed is identical, a transmit rate of a cording rate ⅓ is ⅔ times reduced than a cording rate of ½.

In order to overcome the transmit rate decrement problem, a puncturing bit is re-transmitted in the present embodiment when the repetition scheme is used with a cording rate of ½. Therefore, the receiving side performs the MRC process only for the information bit part, not for the parity bit part among the TC code sequence. That is, a decoding operation is performed using the information bit X and two parity bits Y and W as a ⅓ code, which are inputted through the MRC process, in the TC decoding operation.

Figure 4A:
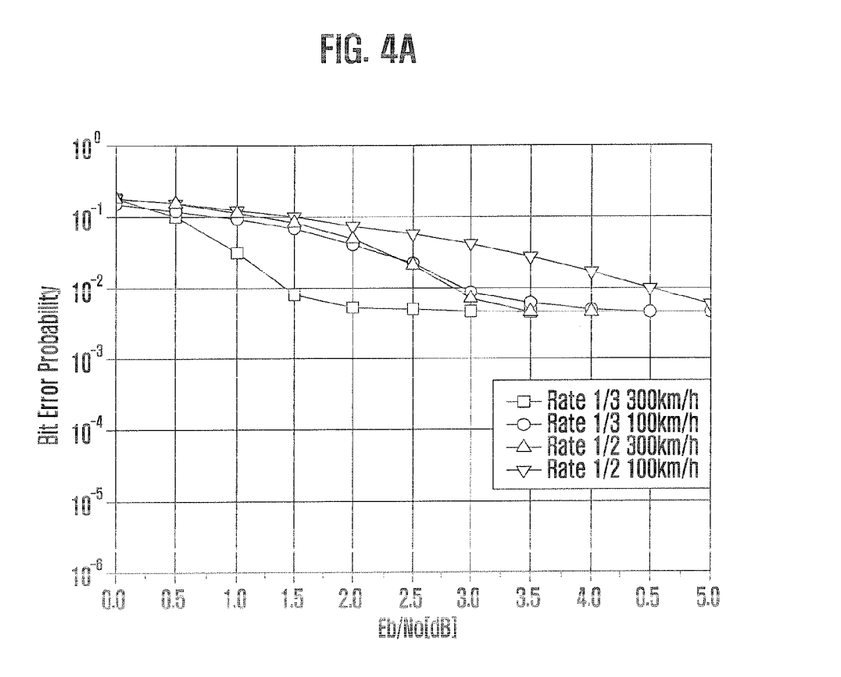
FIG. 4A is a graph illustrating a bit error probability of a TC encoding scheme according to the related art.

FIG. 4A is a graph illustrating a bit error probability of a TC encoding scheme according to the related art. That is, the graph of FIG. 4A shows performances at traveling speeds of 300 km/h and 100 km/h when a rician factor K is 5 dB and coding rates of ⅓ and ½ are used in a channel environment having a blockage region.

As shown in FIG. 4A, a signal is not reached when a packet is transmitted in the blockage region. Therefore, error floor is shown in the graph regardless of the coding rate or the modulation scheme.

Table 2 shows the number of burst packet loss in a channel having a blockage region according to a modulation mode, a coding rate, a packet length, and a travelling speed.

TABLE 2

| Modulation mode and coding rate | Packet length | The number of burst packet loss | | |
|---|---|---|---|---|
| | | 300 km/h | 200 km/h | 100 km/h |
| BPSK, Rate ⅓ | 1.128 ms | 5.3 | 8 | 16 |
| BPSK, Rate ½ | 0.752 ms | 8 | 12 | 24 |
| QPSK, Rate ½ | 0.376 ms | 16 | 24 | 48 |

In order to demodulate packets transmitted in the blockage region, it is required to perform the interleaving operation and it needs the repetition cycles more than the number of burst packet loss even in the traveling speed of 100 km/h. In case of BPSK with a transmit parameter of a coding rate ⅓, it is required to repeatedly transmit a packet with a cycle of more than 16 packets and to perform an interleaving operation by concatenating 16 packets.

Therefore, the present embodiment performs a packet interleaving operation and a packet repetition operation for overcoming signal attenuation and fading caused by the blockage channel environment. The performance of the present embodiment was observed through a simulation as follows.

In the simulation, it is assumed that a rician factor K is 5 dB and a channel has a following blockage region as shown in Table 3.

TABLE 3

| Mobile speed [km/h] | Blockage duration [ms] | Blockage generation cycle [s] |
|---|---|---|
| 300 | 6 | 0.6 |
| 100 | 18 | 1.8 |

In the simulation, a DVB-RCS TC coding scheme is used, a data packet is assumed as a MPEG packet, and a length of the packet is 188 bytes. In consideration of the number of burst packet loss, the number of interleaving packets N is 32 and 48 for a coding rate of ⅓ and a coding rate of ½. Also, the puncturing patterns shown in Table 1 is used, a BPSK modulation scheme is used. Eb/No denotes energy per received bit to noise spectral density ratio.

Figure 4B:
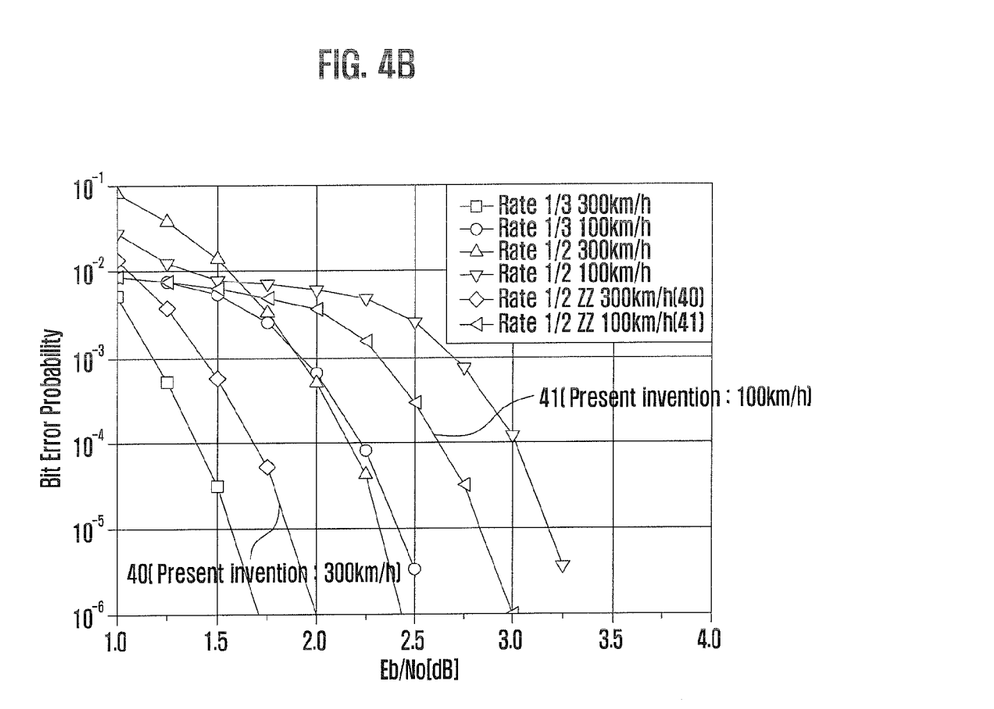
FIG. 4B is a graph showing the improvement of a bit error probability of a TC encoding scheme in accordance with an embodiment of the present invention.

FIG. 4B is a graph showing the improvement of a bit error probability of a TC encoding scheme in accordance with an embodiment of the present invention. The graph of FIG. 4B shows performance of a channel environment having a blockage region where a rician factor K is 5 dB.

Referring to FIG. 4B, the graph clearly shows that the present invention sustains a transmit rate identical to a repetition scheme with a coding rate of ½ and provides performance close to that of a repetition scheme with a coding rate of ⅓.

When a moving object travels at 300 km/h, the performance of a coding rate ⅓ is 1.2 dB different from that of a coding rate of ½ at $10^{-5}$ of a bit error rate. However, if the present invention is applied, about 0.4 dB of performance difference is shown. That is, the present invention can provide better performance while transmitting data at the same speed of a transmission scheme with the coding rate of ½.

When a moving object travels at 100 km/h, the performance of the coding rate ⅓ is about 1 dB different from that of the coding rate of ½ at $10^{-5}$ of a bit error rate. However, if the present invention is applied, about 0.5 dB of performance difference is shown compared with the coding rate of ⅓.

Figure 5A:
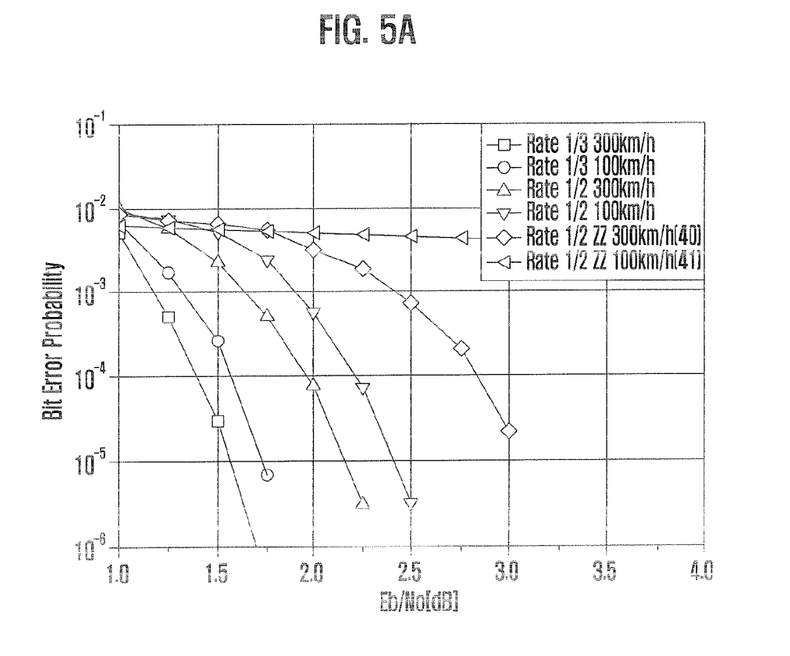
FIGS. 5A and 5B are graphs illustrating the improvement of a bit error probability according to a coding rate in a channel model having a blockage region.
Figure 5B:
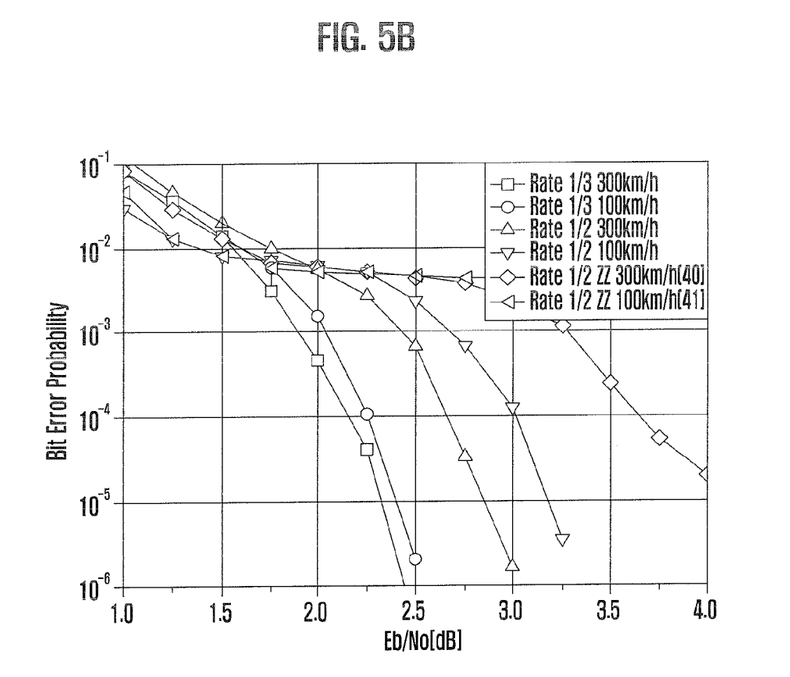

FIGS. 5A and 5B are graphs illustrating the improvement of a bit error probability according to a coding rate in a channel model having a blockage region. The graphs shows performance improvement when an interleaving scheme and a repetition scheme are applied to a channel model having a blockage region and 5 dB of a rician factor K. The graph of FIG. 5A shows the performance improvement for a coding rate of ⅓, and the graph of FIG. 5B shows the performance improvement for a coding rate of ½.

In FIGS. 5A and 5B, 32 packets, 24 packets, and 16 packets are considered as the number of repetition times and concatenation packets in consideration of the number of burst packet loss in Table 2 when the coding rate is ⅓ and BPSK is used. When a coding rate is ½ and BPSK is used, 48 packets, 36 packets, and 24 packets are considered.

As described above, information bits are repeatedly transmitted in the present invention. If a receiver receives a signal transmitted in a normal region without blockage, time diversity effect can be obtained. If a receiver receives a signal transmitted in a blockage region, the failure of packet transmission can be prevented.

Since a plurality of packets are concatenated and interleaved in the present invention, a signal transmitted in a blockage region can be distributed into a plurality of packets. Therefore, a burst error can be prevented.

Moreover, parity bits with different puncturing patterns are repeatedly transmitted in the present invention. Therefore, it is possible to obtain better performance with the same transmit rate.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application Nos. 10-2007-0131243 and 10-2008-0093769, filed with the Korean Intellectual Property Office on Dec. 14, 2007, and Sep. 24, 2008, respectively, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A repetition apparatus for repeatedly transmitting a data packet, comprising:
    a dual data generator for generating an original information bit sequence to be transmitted, and generating a duplicated information bit sequence identical to the original information bit sequence;
    a channel encoder for respectively dividing each of the original information bit sequence and the duplicated information bit sequence into a plurality of information bits, and generating an original coded data packet for the original information bit sequence from the plurality of information bits, and generating a duplicated coded data packet for the duplicated information bit sequence from the plurality of information bits; and
    a transmitter for sequentially transmitting the original coded data packet and the duplicated coded data packet,
    wherein the original coded data packet and the duplicated coded data packet corresponding to the original coded data packet respectively include a corresponding information bit at a same location in the respective sequences, and alternately include each of a plurality of parity bits associated with the corresponding information bit according to different puncturing patterns for each of information bits for the original information bit sequence.

2. The repetition apparatus of claim 1, further comprising:
    an interleaver for interleaving each of the original coded data packet and the duplicated coded data packet.

3. The repetition apparatus of claim 1, wherein the channel encoder performs a turbo encoding operation on each of the plurality of information bits to generate each of the original coded data packet and the duplicated coded data packet.

4. A repetition apparatus for repeatedly receiving a data packet, comprising:
    a receiver for receiving coded data packets transmitted through a wireless channel at different reception times, the coded data packets including an original coded data packet and a duplicated coded data packet that corresponds to the original coded data packet, the original coded data packet and the duplicated coded data packet including a plurality of information bits encoded for an original information bit sequence, and a plurality of parity bits corresponding to the plurality of information bits; and
    a channel decoder for obtaining information bits for the original information bit sequence and the plurality of parity bits from the coded data packets, and performing a channel decoding operation on the plurality of information bits by using the plurality of parity bits, wherein the original coded data packet and the duplicated coded data packet respectively include a corresponding information bit at a same location, and alternately include each of parity bits that are associated with the corresponding information bit according to different puncturing patterns for each of the information bits for the original information bit sequence.

5. The repetition apparatus of claim 4, wherein the channel decoder estimates the information bits for the original information bit sequence by using a maximum ratio combining (MRC) scheme when the original coded data packet and the duplicated coded data packet are received.

6. The repetition apparatus of claim 4, wherein the channel decoder estimates the information bits for the original information bit sequence from information bits of a coded data packet that is received at a predetermined reception time when only one of the original coded data packet and the duplicated coded data packet exists due to transmission in a blockage region.

7. The repetition apparatus of claim 4, further comprising:
a de-interleaver for de-interleaving the received coded data packets.

8. A repetition method for repeatedly transmitting a data packet, comprising:
generating an original information bit sequence to be transmitted, and generating a duplicated information bit sequence identical to the original information bit sequence;
respectively dividing each of the original information bit sequence and duplicated information bit sequence into a plurality of information bits;
generating an original coded data packet for the original information bit sequence from the plurality of information bits, and generating a duplicated coded data packet for the duplicated information bit sequence from the plurality of information bits; and
sequentially transmitting the original coded data packet and the duplicated coded data packet,
wherein the original coded data packet and the duplicated coded data packet corresponding to the original coded data packet respectively include a corresponding information bit at a same location in the respective sequences, and alternately include each of a plurality of parity bits associated with the corresponding information bit according to different puncturing patterns for each of information bits for the original information bit sequence.

9. The repetition method of claim 8, further comprising:
interleaving each of the generated original coded data packet and the generated duplicated coded data packet.

10. The repetition method of claim 8, wherein a turbo encoding operation is performed for each of the plurality of information bits to generate each of the original coded data packet and the duplicated coded data packet.

11. A repetition method for repeatedly receiving a data packet, comprising the steps of:
receiving coded data packets transmitted through a wireless channel at different reception times, the coded data packets including an original coded data packet and a duplicated coded data packet that corresponds to the original coded data packet, the original coded data packet and the duplicated coded data packet including a plurality of information bits encoded for an original information bit sequence, and a plurality of parity bits corresponding to the plurality of information bits;
obtaining information bits for the original information bit sequence and the plurality of parity bits from the coded data packets; and
performing a channel decoding on the plurality of information bits using the plurality of parity bits, wherein
the original coded data packet and the duplicated coded data packet respectively include a corresponding information bit at a same location, and alternately include each of parity bits that are associated with the corresponding information bit according to different puncturing patterns for each of the information bits for the original information bit sequence.

12. The repetition method of claim 11, wherein in the obtaining step, the information bits for the original information bit sequence are obtained by using a maximum ratio combining (MRC) scheme, when the original coded data packet and the duplicated coded data packet are received.

13. The repetition method of claim 11, wherein in the obtaining step, the information bits for the original information bit sequence are obtained from information bits of a coded data packet that is received at a predetermined reception time, when only one of the original coded data packet and the duplicated coded data packet exists due to transmission in a blockage region.

14. The repetition method of claim 11, further comprising the step of:
de-interleaving the received coded data packets.

* * * * *